Jan. 13, 1953   R. M. SPANGLER   2,625,395
HOBBYHORSE
Filed Nov. 27, 1950
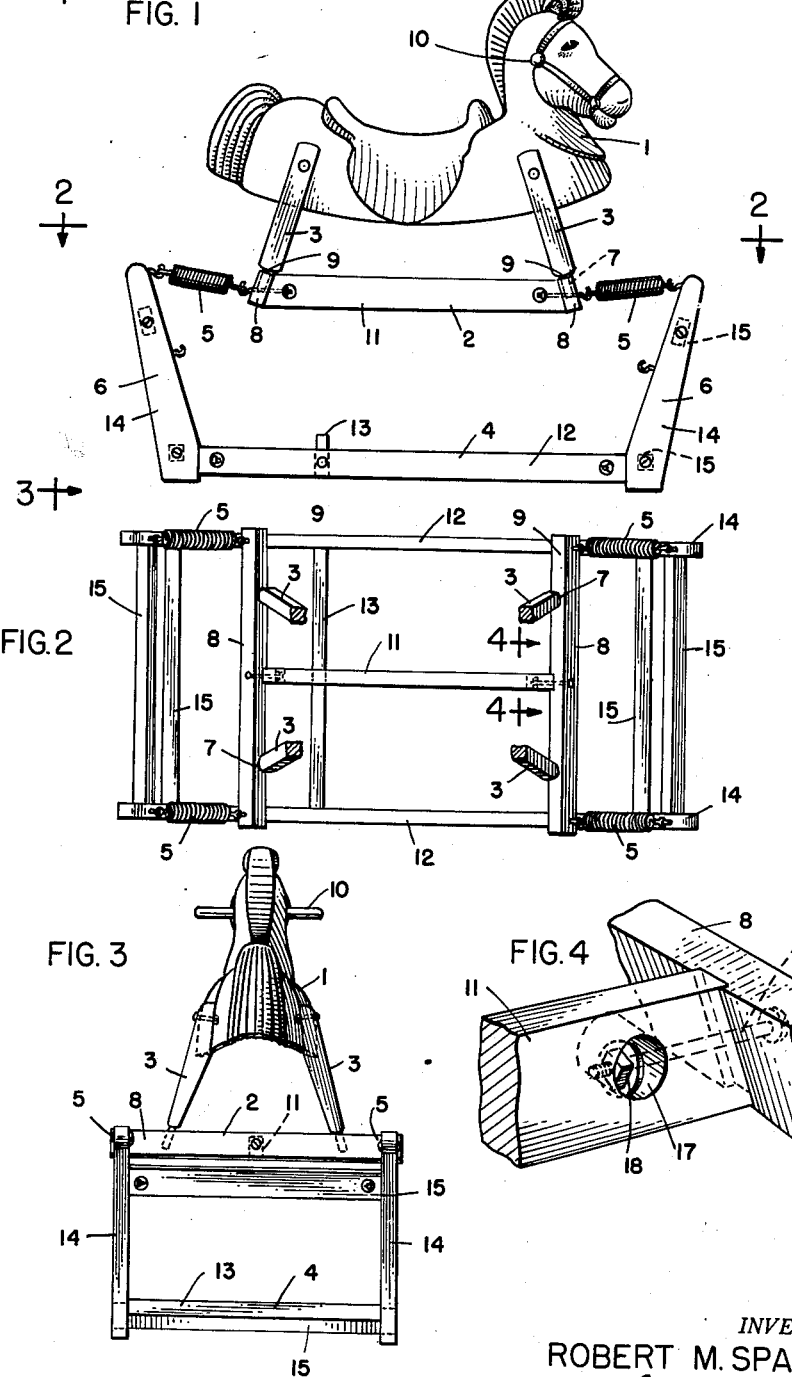
INVENTOR:
ROBERT M. SPANGLER
BY
ATT'YS Patented Jan. 13, 1953

UNITED STATES PATENT OFFICE 2,625,395

HOBBYHORSE

Robert M. Spangler, Chicago, Ill.

Application November 27, 1950, Serial No. 197,678

1 Claim. (Cl. 272—52)

This invention relates to hobby horses of the type in which a simulated animal body, such as that of a horse or other animal, is arranged and mounted so as to be ridden by a child for amusement and exercise involving movements somewhat resembling those of a rider of a horse.

The main objects of this invention are to provide a hobby horse structure of this kind, which is of very sturdy construction and unlikely to get out of order; to provide an improved arrangement of spring structure that permits of any movements of the simulated animal body while normally urging it to a predetermined normal position upon a supporting base frame structure; and to provide an improved arrangement of the frame structure such that a child can easily mount upon and dismount from the animal body without risk of being injured or of causing damage to the structure.

A specific embodiment of this invention is shown in the accompanying drawings in which:

Figure 1 is a side elevation of a preferred form of the invention.

Fig. 2 is a top plan of the base and cradle frames with the animal body removed.

Fig. 3 is an end elevation; and

Fig. 4 is a detail in perspective showing the typical joint construction that is employed for connecting together the structural parts of the base and cradle frames.

In the form shown the animal body 1 is mounted on a horizontally disposed cradle frame 2 by means of four depending legs 3 which are rigidly attached to the animal body. The cradle frame 2 is horizontally disposed and suspended above a horizontal base frame 4 by means of helical tension springs 5 connected to upstanding end frames 6 that are rigidly mounted on the main base frame 4.

The legs 3 of the animal body have dowel formations 7 at their lower ends which are fastened in bores in front and rear cross bars 8 of the cradle frame. These cross bars are of such length as to extend a considerable distance beyond the legs 3, thus providing laterally extending steps 9 that can be used by the child for climbing up on the animal body or descending therefrom and serving also as foot rests for the child while seated on the animal body. A transverse dowel 10 extends through the head of the animal body and beyond the sides thereof to form hand grips. The cross bars 8 are rigidly connected to each other by a middle longitudinal bar 11.

The main base frame 4 is preferably of rectangular form being considerably larger both in length and breadth than the animal body 1 and is made up of spaced longitudinal bars 12 rigidly connected by a sturdy cross bar 13. The longitudinal bars 12 are each rigidly connected at their opposite ends to upright post members 14 of the end frames 6 which posts are rigidly connected by cross bars 15 adjacent their upper and lower ends.

The cradle frame bars 8 are of a length about equal to or slightly greater than the width of the base frame 4. Both ends of each cross bar 8 are connected to the uprights 14 by the helical tension springs 5 in such manner that the springs at one end of the cradle frame extend in substantially the same vertical planes with those at the other end. The springs 5 are of such length as to normally urge the cradle frame 2 to a location centrally above the base frame 4.

Figure 4 shows an enlarged detail of the joint between the cradle cross bar 8 and longitudinal bar 11 wherein the end of the bar 11 is shaped to snugly abut against the side of the bar 8 and is securely held in that position by a bolt 16 that extends through a bore that meets the cross bore 17 in the bar 11, the side wall of the cross bore serving as a seat for the nut and washer 18. This joint construction is typical of all of the frame joints except the dowel connection of the legs 3 to the frame members 8.

Although but one specific embodiment of this invention is herein shown and described, it will be understood that numerous details of the structure shown may be altered or omitted without departing from the spirit of the invention as defined by the following claim.

I claim:

A hobby horse, comprising a simulated animal body providing a rider's seat and having front and rear pairs of legs depending from said body, a horizontally disposed cradle frame having front and rear crossbars and a longitudinal bar rigidly connecting said crossbars forming an H-shaped structure, said pairs of legs being rigidly secured to respective ones of said crossbars and the ends of said crossbars extending laterally substantially beyond the points of attachment of said legs, a rectangular horizontally disposed main base frame having a pair of laterally spaced longitudinally extending side frame members, upright front and rear pairs of post members rigidly mounted on said base frame and extending upwardly beyond the front and rear ends of said cradle frame respectively, and substantially horizontally extending helical tension springs connecting the ends of said cradle frame crossbars to respective upper end portions of said post members for supporting said cradle frame and normally urging it to a horizontal position above said base frame, the springs on each side of said cradle frame lying in a single vertical plane substantially parallel with the respective side member of said base frame and including the respective front and rear post members.

ROBERT M. SPANGLER.

REFERENCES CITED

The following references are of record in the file of this patent:

UNITED STATES PATENTS

| Number | Name | Date |
| --- | --- | --- |
| 208,531 | Marqua | Oct. 1, 1878 |
| 1,468,993 | Converse | Sept. 25, 1923 |
| 1,950,042 | Upper | Mar. 6, 1934 |
| 2,437,015 | Baltz | Mar. 2, 1948 |